United States Patent [19]

Schumacher et al.

[11] Patent Number: 5,315,477

[45] Date of Patent: May 24, 1994

[54] THERMALLY EFFICIENT COMPACT CIRCUIT BREAKER SUPPORT AND ENCLOSURE

[75] Inventors: Richard W. Schumacher, Newington; Denis A. Perzan, Plainville; Peter F. Cavanaugh, West Simsbury; George J. Boucher, Plainville, all of Conn.

[73] Assignee: General Electric Company, New York, N.Y.

[21] Appl. No.: 43,696

[22] Filed: Apr. 8, 1993

[51] Int. Cl.⁵ .......................... H02B 1/04; H05K 7/20
[52] U.S. Cl. .................................. 361/678; 200/289; 361/658
[58] Field of Search .................. 454/1; 165/80.3, 45, 165/912; 200/289; 174/15.1; 361/627, 634, 636, 641, 644, 647, 652, 656, 658, 676, 677, 678

[56] References Cited

U.S. PATENT DOCUMENTS

| | | | |
|---|---|---|---|
| 3,681,663 | 8/1972 | Albers | 361/383 |
| 3,801,875 | 4/1974 | Morby et al. | 317/120 |
| 4,491,897 | 1/1985 | Troebel | 361/353 |
| 4,704,865 | 4/1988 | Barner | 361/346 |
| 5,105,336 | 4/1992 | Jacoby | 361/383 |
| 5,166,861 | 11/1992 | Krom | 361/379 |
| 5,214,564 | 5/1993 | Metzler | 361/385 |

Primary Examiner—Gerald P. Tolin
Attorney, Agent, or Firm—Richard A. Menelly

[57] ABSTRACT

A molded case circuit breaker support and a circuit breaker enclosure are arranged with air transfer slots and passages to promote chimney effect cooling of the circuit breaker components. The slots in the circuit breaker support direct ambient cooling air onto the circuit breaker terminals while the passages through the enclosure direct the ambient air flow from the bottom to the top of the enclosure.

12 Claims, 4 Drawing Sheets

THERMALLY EFFICIENT COMPACT CIRCUIT BREAKER SUPPORT AND ENCLOSURE

BACKGROUND OF THE INVENTION

Circuit breaker components and terminals are sized to provide adequate cooling when rated circuit current flows continuously through the circuit breaker. When such circuit breakers are used within load centers and other such enclosures, consideration is given to the ambient temperature within the enclosure and its effect on the components within the circuit breaker case. Of particular interest is the effect of ambient temperature on the temperature sensing bimetal trip unit which thermally responds to overcurrent conditions through the associated electric circuit to interrupt circuit current when the bimetal becomes thermally-displaced a predetermined distance. In extreme climatic conditions, the circuit breaker may be rated at lower current values when such circuit breakers are within enclosures to compensate for the climatic conditions. A circuit breaker within an enclosure within torrid desert conditions would otherwise interrupt circuit current when normal or rated current transfers through the circuit breaker. This so-called "nuisance tripping" of circuit breakers due to ambient temperature rather than electric circuit conditions can be problematic especially when such circuit breakers protect oil drilling rigs and the like.

U.S. Pat. No. 3,801,875 describes a circuit breaker support base and compact enclosure entirely made from a plastic material. U.S. Pat. No. 4,491,897 describes a similar compact circuit breaker base which can be installed within a metal enclosure. It would be economically advantageous to combine the cost benefits derived from a unitary plastic circuit breaker support base with the thermal advantages attainable with a complete metal enclosure.

Accordingly, one purpose of the invention is to provide a unitary plastic circuit breaker support base requiring fewer component parts along with thermodynamic features that cooperate with the metal heat sink enclosure for excellent electrical response over a wide range of ambient temperature conditions.

SUMMARY OF THE INVENTION

A unitary plastic support base has circuit breaker support features integrally-formed on a top surface to secure the circuit breaker and terminal straps with a minimum number of fasteners. Cooling slots formed in the support under the circuit breaker terminal stabs, promote transfer of ambient cooling air to the stabs. Openings arranged at the top and bottom ends of the metal enclosure further promote the transfer of the cooling air to the support base.

DESCRIPTION OF THE PREFERRED EMBODIMENT

Figure 1:
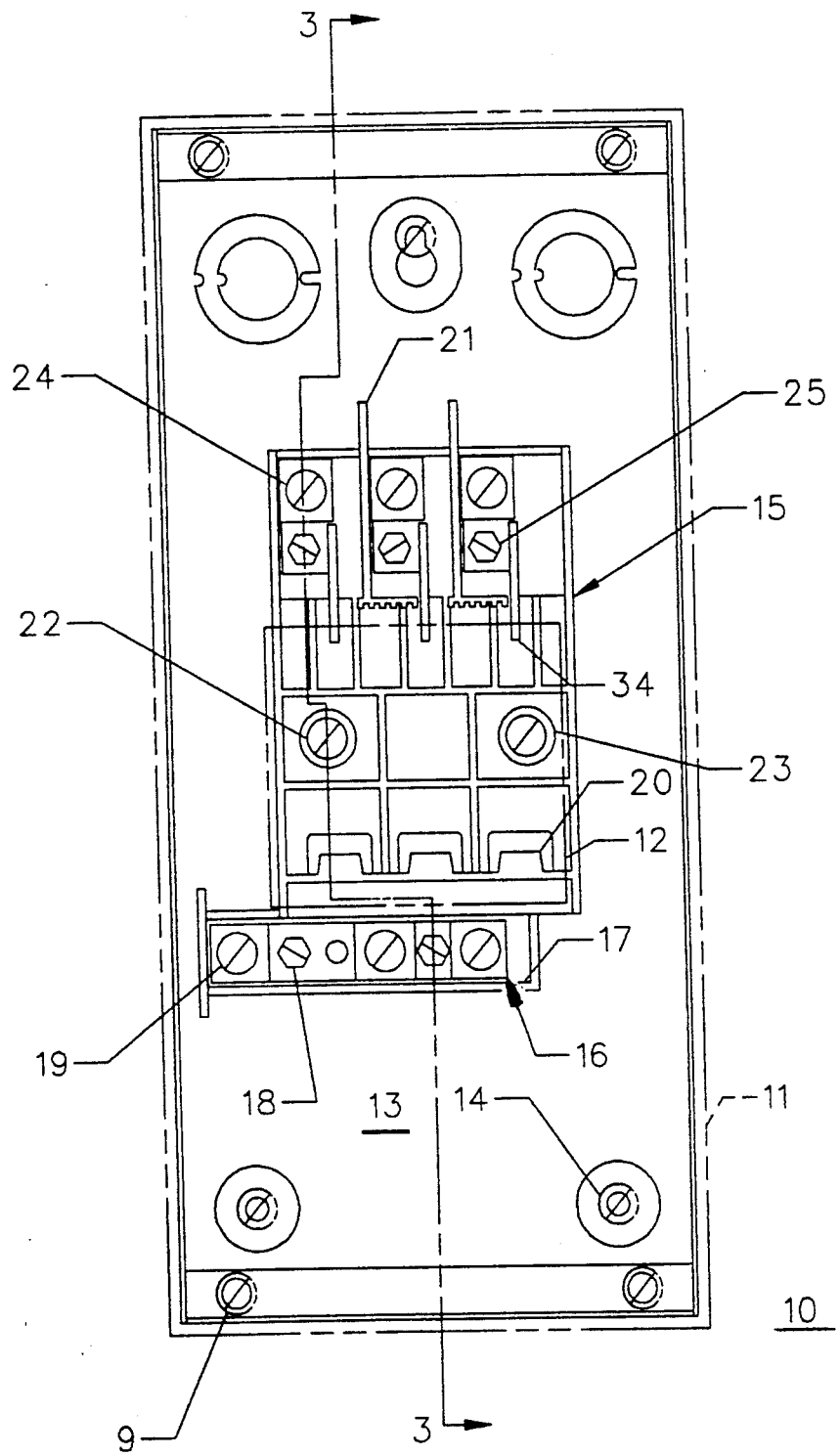
FIG. 1 is a front plan view of a molded case circuit breaker support base within a metal circuit breaker enclosure.

A metal circuit breaker enclosure 10 is shown in FIG. i with the cover 11 in phantom to depict the back plate 13 that is attached to a support wall by means of screws 14, as indicated. The cover is attached to the back plate by means of separate fastening screws 9. An access slot 12 in the cover provides access to the circuit breaker handles when a circuit breaker is mounted on the circuit breaker support assembly 15. The circuit breaker is omitted from the circuit breaker support assembly to detail the attachment of the circuit breaker support assembly to the back plate by means of screws 22 positioned within the screw recesses 23. The circuit breaker mounting hooks 20 hold one end of the circuit breaker which is electrically connected within the electric circuit by means of the circuit breaker stabs 34 upstanding from the shaped load terminal connectors 24. The terminal connectors are attached to the circuit breaker support assembly by means of screws 25. The baffles 21 provide electrical isolation between the circuit breaker stabs and are integrally-formed with the support assembly 15. The neutral bar 16 is supported within a recess 17 formed within the load end of the support assembly and is offset from the end of the assembly for reasons to be discussed below. The neutral lugs 19 provide connection with the electrical distribution neutral conductor and the neutral bar is attached to the support assembly by means of screws 18.

Figure 2:
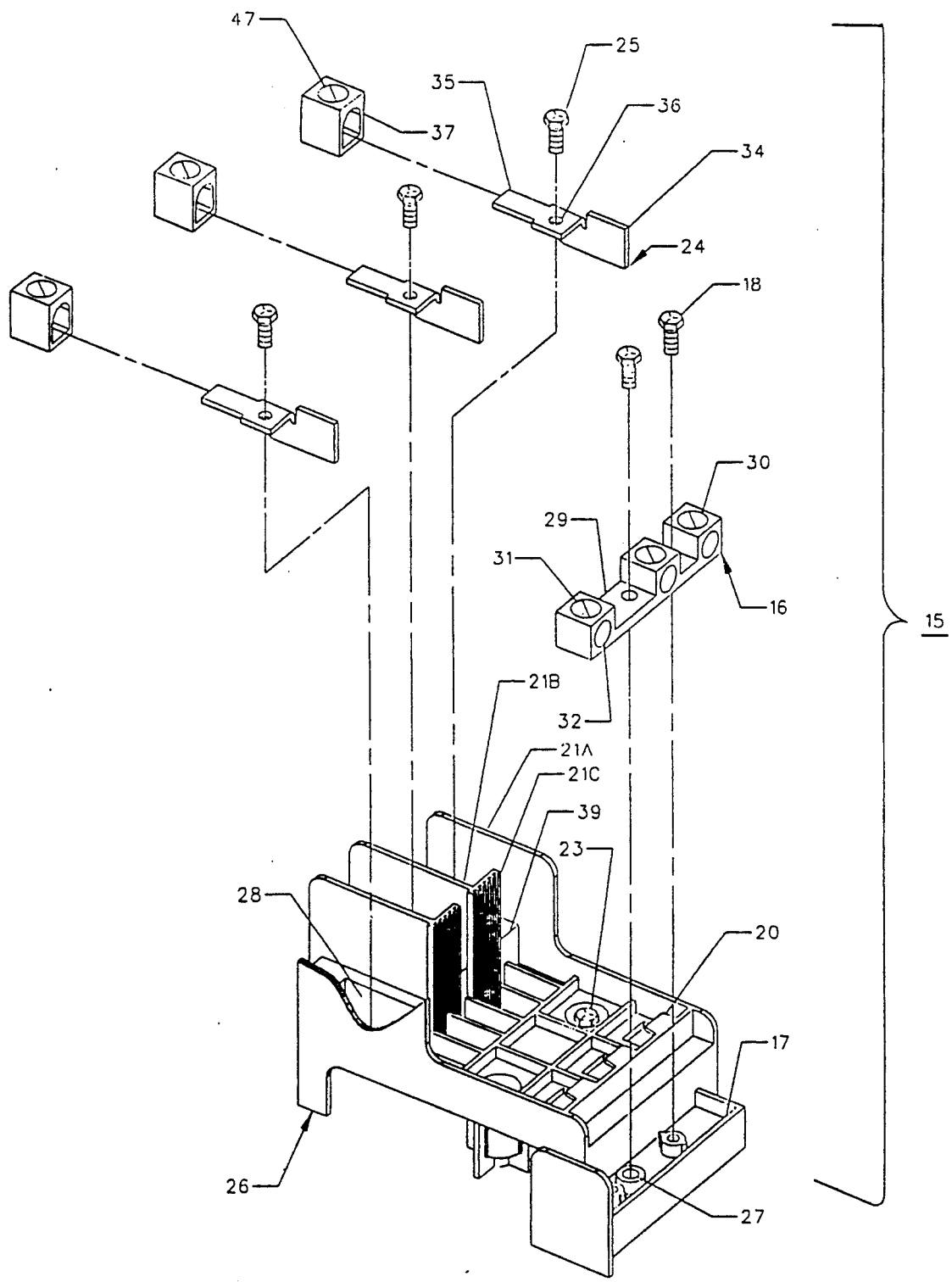
FIG. 2 is an enlarged top perspective view of the circuit breaker support base of FIG. 1 with the terminals depicted in isometric projection.

The circuit breaker support assembly 15 is shown in FIG. 2 prior to attachment of the metal components to the plastic unitary support 26. The support 26 is mold-cast to a configuration that includes upstanding outer shields 21A and angulated inner shields 21B. The front faces 21C of the inner shields are striated to provide electrical over-surface insulation between the load stabs 34 on the connectors 24 when attached to the platform 39 on the support 26 by means of screws 25 and thru-holes 36. The connectors 24 are attached to the protected electrical distribution circuit by means of the terminal lugs 37 which are attached to the bent plate 35 on each of the connectors by means of screws 47. The provision of air transfer slots 28 through the platforms 39 is an important feature of the invention and will be described below in greater detail. The recesses 23 and circuit breaker hooks 20 are integrally-formed within the support 26 along with the recess 17 which contains the neutral bar 16 and the posts 27 which receive the attachment screws 18. The terminal bar is a unitary cast metal piece including a base 29 and lugs 30. Electrical connection between the electrical distribution circuit and the external load circuit is made by means of the threaded wire openings 31, 32.

Figure 3:
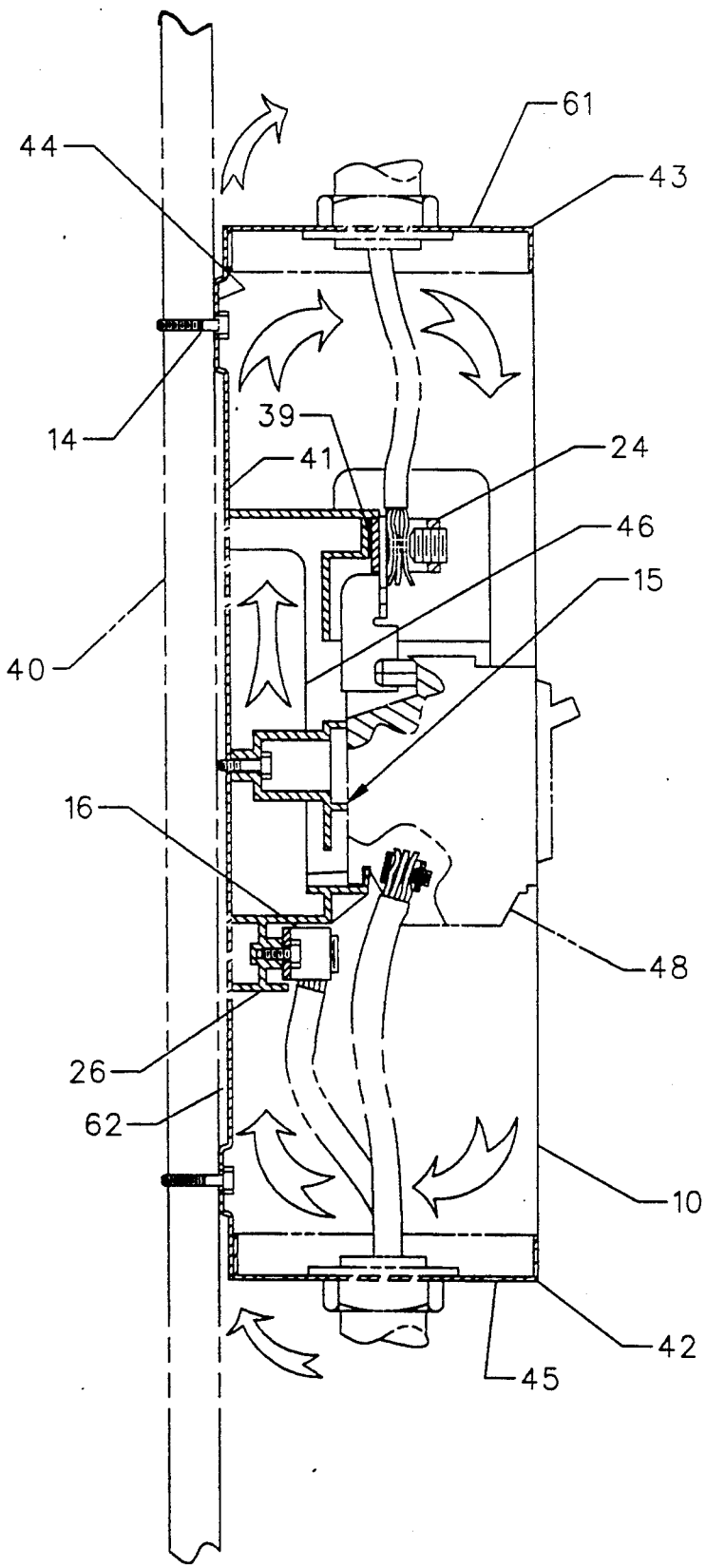
FIG. 3 is an enlarged sectional side view of the circuit breaker support base and enclosure of FIG. 1 viewed in the 3—3 plane.

The thermodynamic interaction between the circuit breaker support assembly 15 and the load center 10 is best seen by referring now to FIG. 3 wherein the circuit breaker 48 is depicted in phantom to more clearly portray the structure of the support 26 and the backwall 41 of the load center. The ambient air flow is depicted by arrows and is seen to proceed from outside the load center through the perforations 45 in the bottom wall 42 of the load center under the neutral bus 16 and up through the cooling slots 46 formed within the platforms 39 described earlier. The cooling air then transports by the load terminal 24 carrying away the heat generated within the circuit breaker out through the perforations 61 formed through the top wall 43 of the load center. The so-called "chimney effect" cooling by the flow of cooling air from the bottom to the top of the load center is further enhanced by the provision of protrusions 44 formed in the back wall 41 through which the screws 14 extend that attach the load center to the support wall 40 as shown in phantom. The protrusions space the load center away from the support wall to define a channel 62 for the passage of additional cooling air flow exterior to the bottom wall of the load center. The arrangement of the cooling slots 46 and perforations 45, 61 allows the size of the load center 10 to be smaller and more compact than ordinarily required to prevent heat buildup within the circuit breaker over long term operation with quiescent circuit current transfer through the circuit breaker and enclosure.

Figure 4:
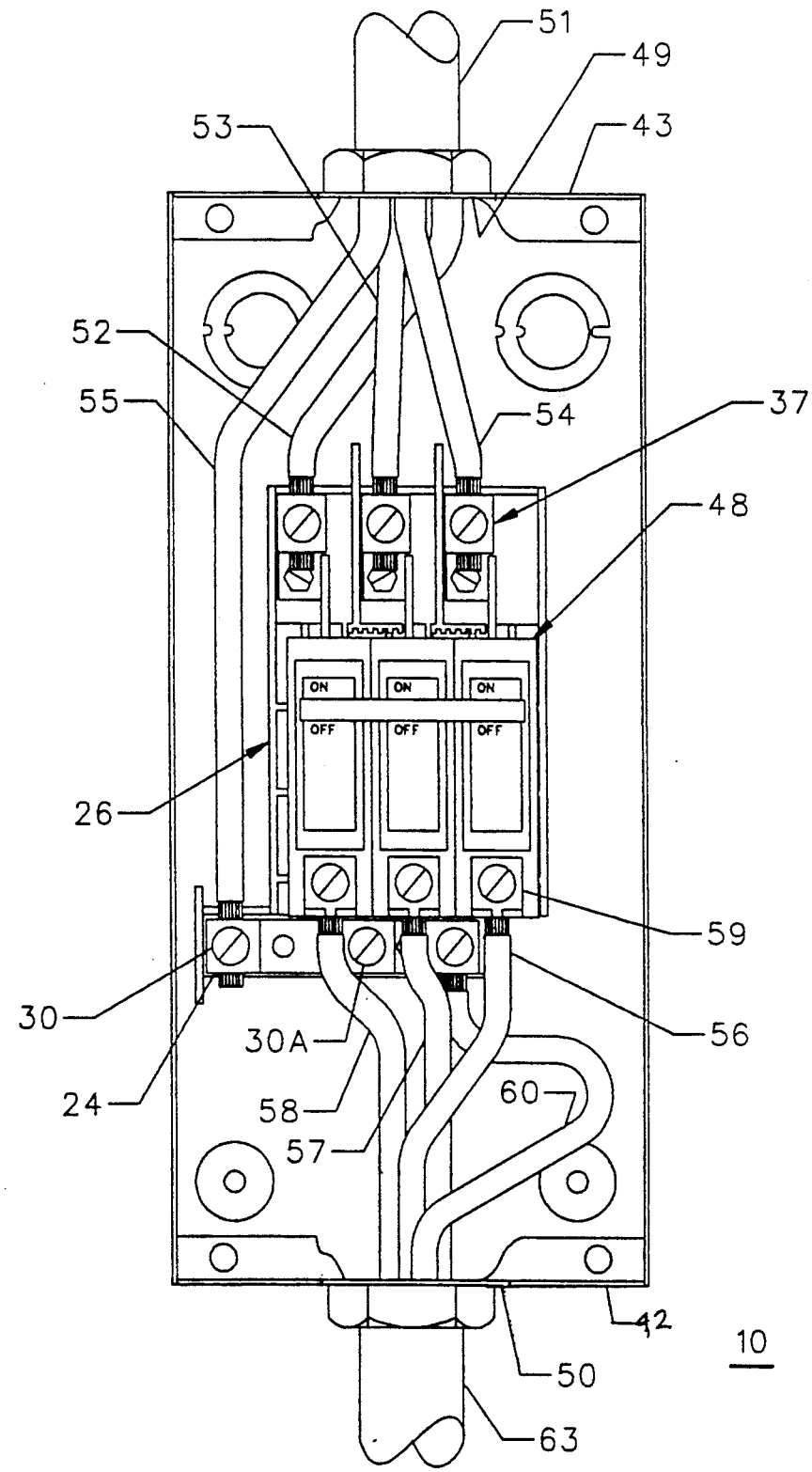
FIG. 4 is a plan view of the load center of FIG. 1 with the cover removed and a circuit breaker mounted on the circuit breaker support assembly.

An additional feature of the invention is the ease of electrical connection of the circuit breaker 48 within the electrical distribution circuit which is seen by referring now to the load center 10 shown in FIG. 4. The neutral bar connector 24 is intentionally off-set from the end of the support 26 to allow for direct connection with the line terminal neutral conductor 55 extending from the line cable 51. The line phase conductors 52-54 and the line neutral conductor 55 each enter the load center by means of a knock-out 49 provided within the top wall 43. Accordingly, the line phase conductors directly connect with the respective terminals of the line terminal connector 37 and the line neutral conductor directly connects with the neutral bar 24 as indicated. The load cable 63 is located at the bottom of the load center and the load neutral conductor 60 and load phase conductors 56-58 enter the load center through a knock-out 50 formed in the bottom wall 42. The load phase conductors 56-58 pass between the neutral lugs 30 upstanding from the neutral bar 24 and attach directly with the load terminal connectors 59 on the circuit breaker 48. The remaining neutral terminal lug indicated at 30A is connected with load external ground if such ground connection is required. The off-set relation between the end of the support 26 and the neutral connector 24 also contributes to the flow of cooling air by exposing a larger surface of the support to intercept the cooling air transport described earlier with reference to FIG. 3.

A compact thermally-efficient load center has herein been described where the components on the circuit breaker support are positioned to promote flow of ambient cooling air by chimney effect transfer to the circuit breaker from the bottom to the top of the load center.

Having thus described our invention, what we claim as new and desire to secure by Letters Patent is:

1. A compact molded case circuit breaker load center comprising:
   an enclosure having top, bottom and back walls defining a front part that is covered by a front plate, said enclosure being accessible by means of a front slot through said front plate;
   a circuit breaker support assembly within said enclosure attached to said back wall, said support assembly comprising a plastic unitary piece having circuit breaker engaging hooks at one end and means receiving neutral connectors at an opposite end, said support assembly including platform means supporting circuit breaker stab connectors, said platform means being slotted under said stab connectors for passing cooling air up through said platform and;
   perforations through said top and bottom walls for allowing passage of cooling air into and out of said enclosure.

2. The compact molded case circuit breaker load center of claim 1 wherein said means receiving neutral connectors comprises a neutral bar.

3. The compact molded case circuit breaker load center of claim 2 wherein said neutral bar sits in a recess integrally-formed within said plastic unitary piece at said opposite end.

4. The compact molded case circuit breaker load center of claim 3 wherein said recess is off-set from one end of said unitary piece.

5. The compact molded case circuit breaker load center of claim 1 wherein said back wall includes a plurality of protrusions spacing said back wall away from a support wall, said protrusions defining passage for transfer of cooling air intermediate said back wall and said support wall.

6. The compact molded case circuit breaker load center of claim 1 including a circuit breaker supported on said support assembly.

7. The compact molded case circuit breaker load center of claim 6 wherein said top wall includes a passage for a plurality of electrical line conductors connecting with corresponding line terminals on one end of said circuit breaker.

8. The compact molded case circuit breaker load center of claim wherein said bottom wall includes a passage for a plurality of electrical load conductors connecting with corresponding load terminals on an opposite end of said circuit breaker.

9. The compact molded case circuit breaker load center of claim 8 including a line neutral conductor passing through said top wall and extending parallel to said circuit breaker, said neutral line conductor being arranged for connecting with said neutral terminal bar at said opposite end of said circuit breaker.

10. A circuit breaker support assembly comprising in combination:
    a plastic unitary piece having circuit breaker engaging hooks at one end and a neutral terminal bar at an opposite end, said support assembly including platform means supporting circuit breaker stab connectors, said platform means being slotted under said stab connectors for passing cooling air up through said platform means.

11. The circuit breaker support assembly of claim 10 wherein said terminal bar sits in a recess integrally-formed within said plastic unitary piece at said opposite end.

12. The circuit breaker support assembly of claim 11 wherein said recess is off-set from one end of said unitary piece thereby promoting transfer of cooling air to said unitary piece.

* * * * *